(12) United States Patent
Cress

(10) Patent No.: US 10,145,292 B1
(45) Date of Patent: Dec. 4, 2018

(54) SPARK PLUG

(71) Applicant: Caterpillar Inc., Peoria, IL (US)

(72) Inventor: James J. Cress, West Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/684,973

(22) Filed: Aug. 24, 2017

(51) Int. Cl.
*F02B 19/12* (2006.01)

(52) U.S. Cl.
CPC .................................. *F02B 19/12* (2013.01)

(58) Field of Classification Search
CPC .. F02B 9/12; F02B 13/00; F02B 9/007; H01T 13/08; H01T 13/32; H01T 13/54
See application file for complete search history.

(56) References Cited

U.S. PATENT DOCUMENTS

| | | | |
|---|---|---|---|
| 6,013,973 A | 1/2000 | Sato | |
| 6,460,506 B1 | 10/2002 | Nevinger | |
| 9,093,823 B2 | 7/2015 | Sakakura et al. | |
| 9,929,539 B2 * | 3/2018 | Maul | H01T 13/32 |
| 2007/0236122 A1 | 10/2007 | Borror | |
| 2017/0047712 A1 | 2/2017 | Niessner et al. | |
| 2018/0123324 A1 * | 5/2018 | Niessner | H01T 13/08 |

FOREIGN PATENT DOCUMENTS

DE 102008036432 9/2009

* cited by examiner

*Primary Examiner* — Hieu T Vo

(57) ABSTRACT

A spark plug including a pre-chamber for an engine is provided. The spark plug extends along a spark plug longitudinal axis. The spark plug includes a first cylindrical structure having a wall defining a bore. An electrode is positioned inside the bore such that the electrode is spaced apart from the wall to define at least one electrode spark gap. The spark plug further includes a second cylindrical structure configured to receive the first cylindrical structure. The second cylindrical structure has one or more access apertures configured to facilitate access to the wall of the first cylindrical structure, wherein a plane perpendicular to the spark plug longitudinal axis passes through the electrode spark gap and intersects the one or more access apertures.

16 Claims, 4 Drawing Sheets

SPARK PLUG

TECHNICAL FIELD

The present disclosure relates to a spark plug for use in an engine. More particularly, the present disclosure relates to a pre-chamber spark plug for the engine.

BACKGROUND

Internal combustion engines often emit harmful oxides of nitrogen ("$NO_x$") during operation. Typically, the level of $NO_x$ formed increases as the peak combustion temperatures within a main combustion chamber increases. Therefore, lean fuel mixtures are often used to reduce the peak combustion temperatures in the main combustion chamber, and reduce the amount of harmful $NO_x$ emitted. A lean fuel mixture has a relatively large air-to-fuel ratio when compared to a stoichiometric air-to-fuel ratio. However, using a lean fuel mixture may result in incomplete combustion i.e. lean misfire within the main combustion chamber.

Pre-chamber spark plugs are known to create a conducive environment for igniting such lean fuel mixture. Ignition of the lean fuel mixture within the pre-chamber of the pre-chamber spark plug creates a jet of burning fuel that is further directed into the main combustion chamber. The jet further ignites the lean fuel mixture within the main combustion chamber to propagate ignited flame across the main combustion chamber. Generally, such pre-chamber spark plugs include two electrodes that define a predefined gap therebetween. This predefined gap is defined such that a spark is generated therein during compression stroke to ignite the fuel mixture. However, due to continual usage of the spark plug, the electrodes may experience wear and tear thereby increasing the gap.

U.S. Pat. No. 6,013,973 relates to a spark plug for use in conventional fuel ignition systems includes a housing and a ground electrode attached to the housing. A center electrode is located within the housing and is spaced apart from the ground electrode to form an electrode gap. An insulation member electrically separates the center and ground electrodes. A sub-combustion chamber is further located on the spark plug and encloses the electrode gap. A plurality of holes is located within the walls of the sub-combustion chamber where both a fuel-air mixture and combustion gasses pass through.

SUMMARY

In one aspect, a spark plug including a pre-chamber for an engine is provided. The spark plug extends along a spark plug longitudinal axis. The spark plug includes a first cylindrical structure having a wall defining a bore forming the pre-chamber. An electrode is positioned inside the bore such that the electrode is spaced apart from the wall to define at least one electrode spark gap. The spark plug further includes a second cylindrical structure configured to receive the first cylindrical structure. The second cylindrical structure has one or more access apertures configured to facilitate access to the wall of the first cylindrical structure, wherein a plane perpendicular to the spark plug longitudinal axis passes through the electrode spark gap and intersects the one or more access apertures.

In another aspect of the present disclosure, an engine is provided. The engine includes a cylinder head, a piston, a main combustion chamber defined between the cylinder head and the piston and a spark plug. The spark plug includes a pre-chamber provided in fluid connection with the main combustion chamber and configured to form a flame jet directed into the main combustion chamber. The spark plug extends along a spark plug longitudinal axis. The spark plug includes a first cylindrical structure having a wall defining a bore forming the pre-chamber. An electrode is positioned inside the bore such that the electrode is spaced apart from the wall to define at least one electrode spark gap. The spark plug further includes a second cylindrical structure configured to receive the first cylindrical structure. The second cylindrical structure has one or more access apertures configured to facilitate access to the wall of the first cylindrical structure, wherein a plane perpendicular to the spark plug longitudinal axis passes through the electrode spark gap and intersects the one or more access apertures.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
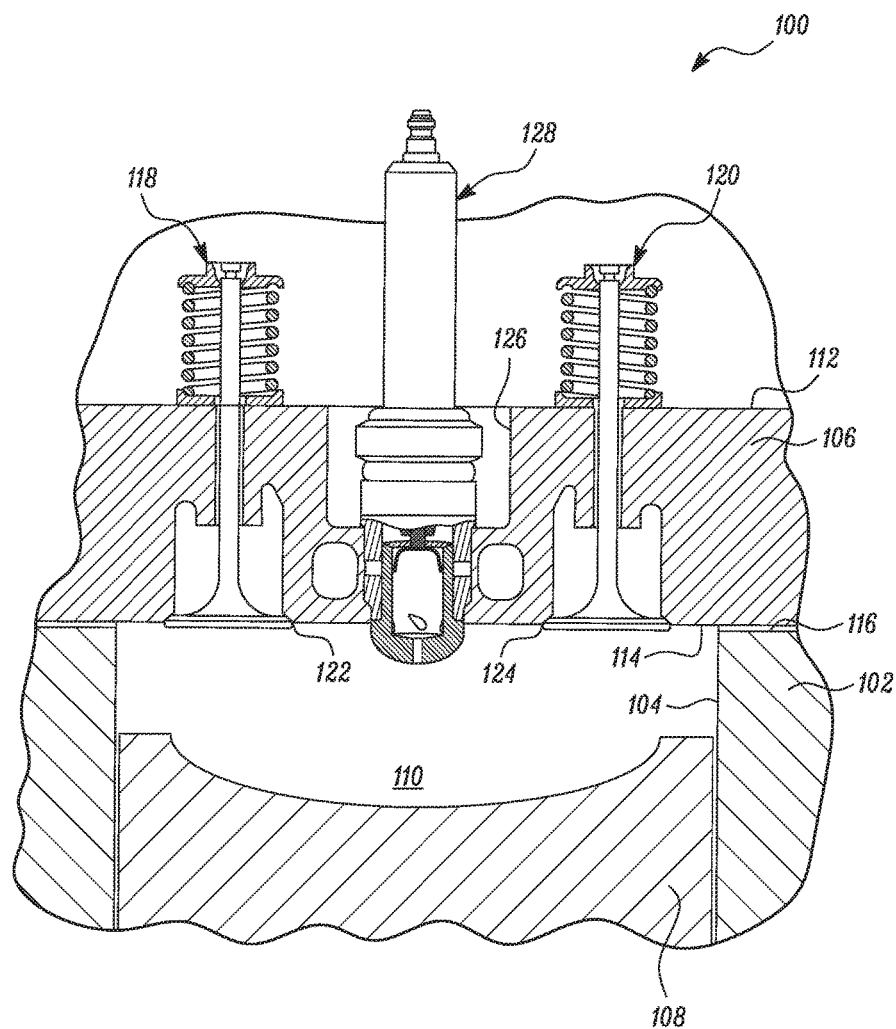
FIG. 1 illustrates a cross-section view of an exemplary spark ignited internal combustion engine, in accordance with an embodiment of the present disclosure.

The present disclosure relates to a pre-chamber spark plug for use in an engine. FIG. 1 illustrates a portion of an exemplary internal combustion engine 100, according to an embodiment of the present disclosure. The engine 100 includes a cylinder block 102 having a cylinder bore 104 defined therein. The engine 100 further includes a cylinder head 106 and a piston 108. The piston 108 is movably positioned within the cylinder bore 104. The cylinder block 102, the cylinder head 106 and the piston 108 define a main combustion chamber 110. The main combustion chamber 110 is configured to receive and burn fuel/air-fuel mixture, i.e. charge. A motion of the piston 108 is configured to transmit driving force generated by the burning charge to an output shaft (not shown), such as a crankshaft of the engine 100.

The cylinder head 106 defines a top surface 112 and a bottom surface 114, such that the bottom surface 114 is removably attached to a top end 116 of the cylinder block 102. Further, the cylinder head 106 includes at least one intake valve mechanism 118 and at least one exhaust valve mechanism 120 operatively positioned therein. An intake sealing portion 122 of the intake valve mechanism 118 and an exhaust sealing portion 124 of the exhaust valve mechanism 120 are provided at the bottom surface 114 of the cylinder head 106. The intake valve mechanism 118 and the exhaust valve mechanism 120 may be operated as conventionally known, such as by a cam, a follower and a push rod mechanism (not shown). It may be contemplated, that the operation of the intake valve mechanism 118 and the exhaust valve mechanism 120 are merely exemplary and do not limit the scope of the claimed subject matter.

The cylinder head 106 further includes a stepped through bore 126 formed therein and extending between the top surface 112 and the bottom surface 114, such that the stepped bore 126 is centered about the cylinder bore 104. Alternatively, any other configuration of the stepped through bore 126 may be envisioned without deviating from the scope of the claimed subject matter.

As shown in FIG. 1, the engine 100 includes a spark plug 128 positioned in the stepped through bore 126 and configured to ignite the charge received in the main combustion chamber 110. According to an exemplary embodiment of the present disclosure, the spark plug 128 is of an encapsulated design. The spark plug 128 includes a connecting portion, such as a threaded connector, configured to couple with a fastening mechanism, such as a threaded portion, provided in the stepped through bore 126 to sealingly connect the spark plug 128 with the cylinder head 106. An engagement between the connecting portion and the fastening mechanism is configured to be capable of withstanding pressure, temperature, and chemistry compatibility of the combustion process. The spark plug 128 is further explained in greater detail with reference to FIGS. 2 and 3 in the following description.

Figure 2:
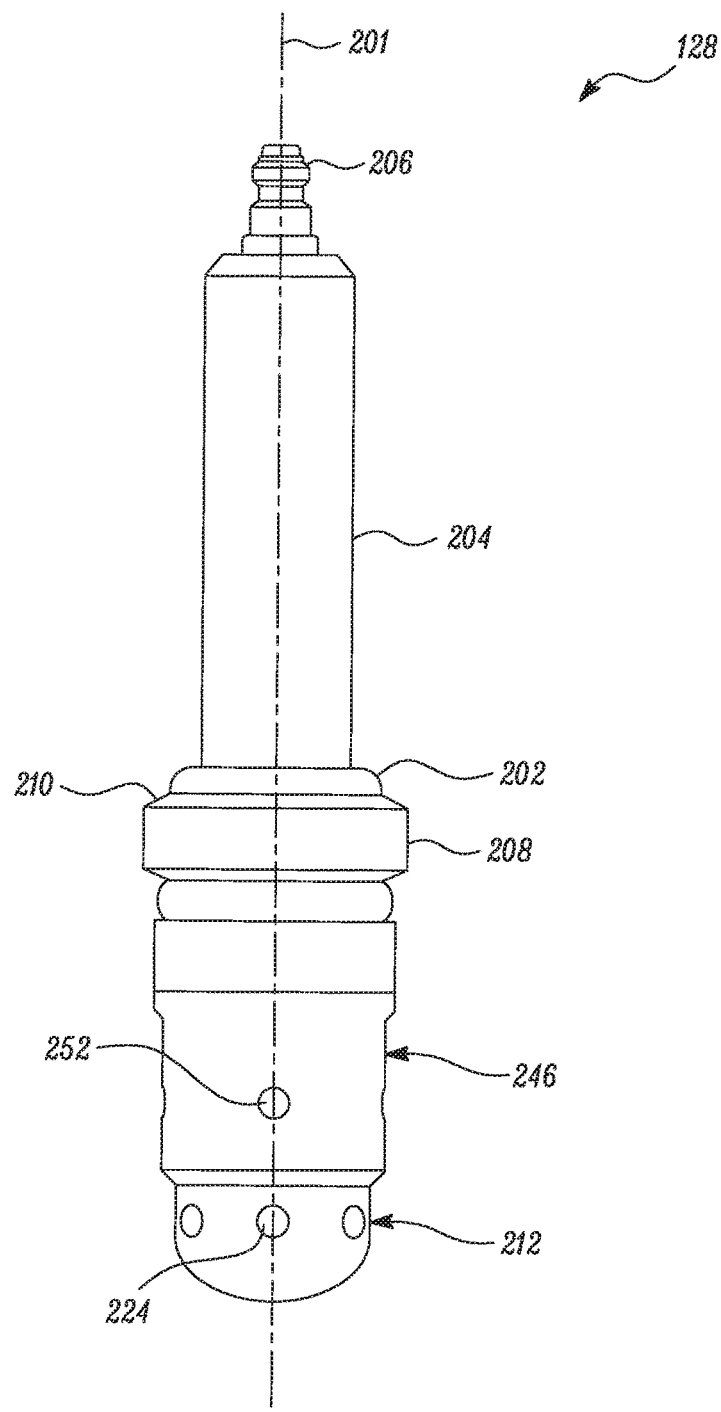
FIG. 2 illustrates an exemplary spark plug including a pre-chamber, in accordance with an embodiment of the present disclosure.
Figure 3:
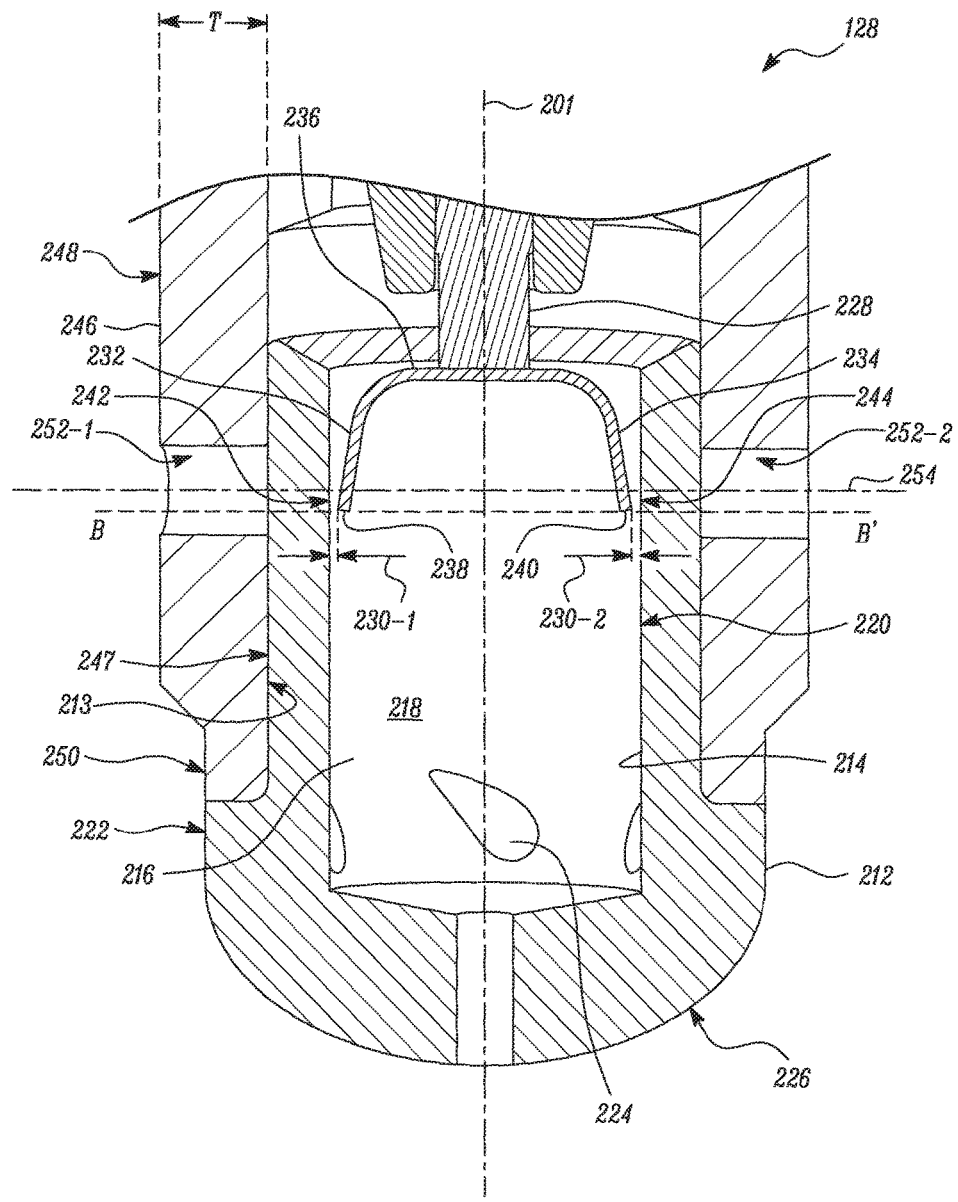
FIG. 3 illustrates a cross-sectional view of a portion of the spark plug, in accordance with the embodiment of the present disclosure.
Figure 4:
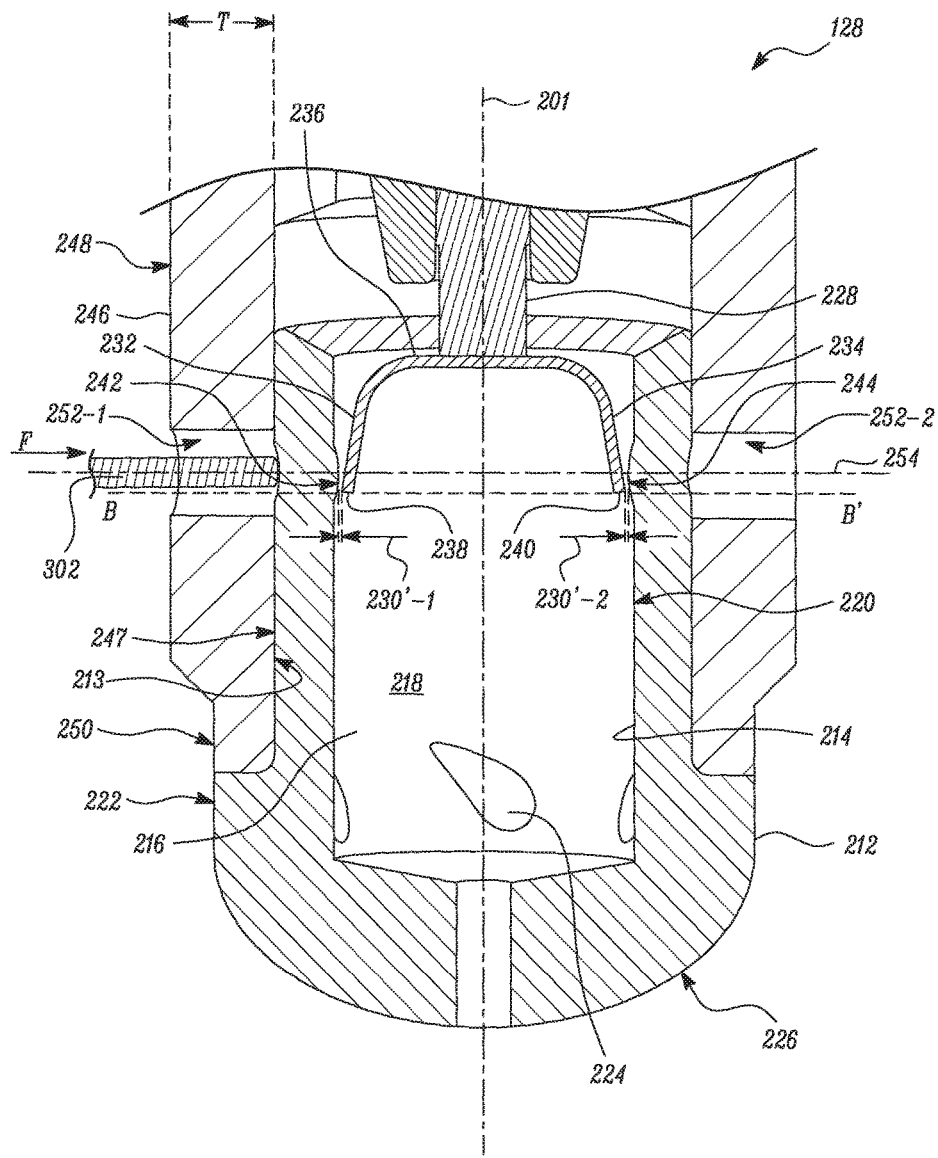
FIG. 4 illustrates the cross-sectional view of the portion of the spark plug with reduced electrode spark gap, in accordance with the embodiments of the present disclosure.

FIG. 2 illustrates a front view of the spark plug 128, according to an embodiment of the present disclosure. FIG. 3 illustrates a cross-sectional view of a portion of the spark plug 128, according to an embodiment of the present disclosure. Referring to the FIGS. 2-3, the spark plug 128 defines along a pre-chamber spark plug longitudinal axis 201 and includes an insulator retention portion 202, an insulator 204, and a conductive terminal 206. The conductive terminal 206 may be a means for conducting an electrical discharge and is made of a material having good electrical conductivity and heat resistance. In an example, the conductive terminal 206 may be made up of a nickel alloy. The insulator 204 may be a means for insulating and is configured to electrically isolate the terminal 206 and maintain structural integrity of the spark plug 128 in a high temperature environment. In an example, the insulator 204 may be made up of a ceramic material. Further, the insulator retention portion 202 includes a plug shell 208 and a connection region 210.

In an embodiment of the present disclosure, the spark plug 128 includes a first cylindrical structure 212 having an annular wall 214 defining an enclosed bore 216. In an example, the enclosed bore 216 forms a pre-combustion chamber 218 (hereinafter referred to as the pre-chamber 218) for the main combustion chamber 110. The first cylindrical structure 212 has a top portion 220 and a bottom portion 222. The top portion 220 is connected to the connection region 210 and the bottom portion 222 defines one or more flow channels 224 configured to fluidly couple the pre-chamber 218 with the main combustion chamber 110. The first cylindrical structure 212 further forms a shell having an oval configuration or has a parabolic end 226 extending at the bottom portion 222.

In the illustrated embodiment, the first cylindrical structure 212 includes four circumferentially equidistant flow channels 224 (only three shown in FIG. 3) provided on the bottom portion 222. However, it may be contemplated that the number of flow channels 224 is merely exemplary and may vary based on the size of the spark plug 128. In an exemplary embodiment, the one or more flow channels 224 facilitate intake of the air-fuel mixture into the enclosed bore 216 and/or the pre-chamber 218 during the compression stroke of the engine 100 and/or directing a flame jet formed within the pre-chamber 218 into the main combustion chamber 110 during power stroke of the engine 100. Alternatively, the spark plug 128 may include a fuel supply channel (not shown) opening in the pre-chamber 218 for supplying the fuel and the one or more flow channels 224 may facilitate directing the flame jet formed within the pre-chamber 218 into the main combustion chamber 110.

As illustrated in FIG. 3, the spark plug 128 includes a center electrode 228 positioned inside the bore 216 such that the electrode 228 is spaced apart from the wall 214 of the bore 216 to define an electrode spark gap 230. In an embodiment of the present disclosure, the center electrode 228 includes a first portion 232, a second portion 234 and a third portion 236 connecting the first portion 232 and the second portion 234 to define a U-shaped cross-sectional tip structure of the electrode 228. The U-shaped tip structure of the electrode 228 thereby has a first end 238 and a second end 240. The wall 214 circumferentially extends around the tip structure i.e., the first end 238 and the second end 240 of the center electrode 228.

As illustrated in FIG. 3, the wall 214 includes a first wall portion 242 proximal to and spaced apart from the first end 238 of the center electrode 228 to define a first electrode spark gap 230-1. Similarly, the wall 214 includes a second wall portion 244 proximal to and spaced apart from the second end 240 of the center electrode 228 to define a second electrode spark gap 230-2 respectively.

The center electrode 228 is operatively connected to the conductive terminal 206 which is further connected to a high voltage ignition coil (not shown). The high voltage created by the ignition coil is applied to the spark plug 128, and a voltage difference created between the first end 238 and the second end 240 of the center electrode 228 and the wall 214 then causes an electrical discharge or spark to generate within the electrode spark gap 230 (including electrode spark gaps 230-1, 230-2). Further, the spark generated within the electrode spark gap 230, causes ignition of the air-fuel mixture within the pre-chamber 218 of the spark plug 128. Furthermore, the flame generated within the pre-chamber 218 spreads outside the pre-chamber 218 and into the main combustion chamber 110 via the one or more flow channels 224.

In an embodiment of the present disclosure, the spark plug 128 includes a second cylindrical structure 246 having a top portion 248 and a bottom portion 250. The second cylindrical structure 246 is configured to surround and attach to at least a portion of the first cylindrical structure 212 such that the bottom portion 222 of the first cylindrical structure 212 extends beyond the bottom portion 250 of the second cylindrical structure 246. For example, an inner surface 247 of the second cylindrical structure 246 abuts an outer surface 213 of the first cylindrical structure 212.

In an embodiment, the second cylindrical structure 246 includes one or more access apertures 252 configured to facilitate access to the wall 214 of the first cylindrical structure 212. In an embodiment of the present disclosure, the second cylindrical structure 246 may include four equidistant circumferentially disposed access apertures 252 (only two shown in FIG. 3, i.e., access apertures 252-1, 252-2). However, the number of access apertures 252 may be varied according to the size of the spark plug 128 and the second cylindrical structure 246.

The access apertures 252 are through holes extending through a thickness T of the second cylindrical structure 246. In an embodiment of the present disclosure, the access apertures 252 are positioned such that an imaginary plane B-B' perpendicular to the spark plug longitudinal axis 201 intersects the access aperture 252 and passes through the electrode spark gap 230. In one example, the plane B-B' may be parallel to a longitudinal axis 253 of the access apertures 252. In another example, the plane B-B' may intersect with the longitudinal axis 253 of the access apertures 252 at an angle within a range of 5 to 30 degrees. In one example, the access apertures 252 may include a cylindrical cross-section. In another example, the apertures 252 may include a frusto-conical cross-section. Any other cross-sectional shape of the access apertures 252 may also be envisioned without deviating from the scope of the claimed subject matter. In an embodiment, the access apertures 252 including 252-1 and 252-2 and so on, may be identical in structure. However, alternatively, one or more of the access apertures 252, such as the access aperture 252-1 may have different cross-sectional structure than the other access aperture 252-2 provided on the second cylindrical structure 246.

INDUSTRIAL APPLICABILITY

With continued operation of the spark plug 128, the electrode spark gap 230 may enlarge, thereby reducing the efficiency of the spark generation by the spark plug 128. In order to re-gap and/or reduce the electrode spark gap 230, a tool 302 is provided access to the first wall portion 242 and the second wall portion 244 through the access apertures 252-1, 252-2, such that the tool 302 applies force F to deform the wall 214 at the first wall portion 242 and the second wall portion 244 and reduce the respective electrode spark gap 230'-1 and 230'-2, as shown in FIG. 3. In an embodiment, the tool 302 may be a mechanical push rod. However, it may be contemplated that the tool 302 being a mechanical push rod is merely exemplary and is not intended to be limiting in any manner. It may be further contemplated that the force F may alternatively be applied by using any other means, such as hydraulic or pneumatic pressure, without deviating from the scope of the claimed subject matter. Therefore, the spark plug 128 according to the various embodiments of the present disclosure has an increased life.

While aspects of the present disclosure have been particularly depicted and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A spark plug including a pre-chamber for an engine, the spark plug extending along a spark plug longitudinal axis and comprising:
   a first cylindrical structure having a wall defining a bore forming the pre-chamber;
   an electrode positioned inside the bore, wherein the electrode is spaced apart from the wall to define at least one electrode spark gap; and
   a second cylindrical structure at least partially surrounding the first cylindrical structure and having one or more access apertures configured to facilitate access to the wall of the first cylindrical structure, wherein a plane perpendicular to the spark plug longitudinal axis passes through the electrode spark gap and intersects the one or more access apertures.

2. The spark plug of claim 1, wherein the first cylindrical structure includes one or more flow channels at a bottom end to fluidly connect the pre-chamber and the main combustion chamber.

3. The spark plug of claim 1, wherein the one or more access aperture facilitate application of force by at least one tool to deform the wall of the first cylindrical structure to reduce the electrode spark gap.

4. The spark plug of claim 1, wherein the electrode includes a first portion, a second portion and a third portion connecting the first and the second portion to define a U-shaped structure of the electrode having a first end and a second end.

5. The spark plug of claim 4, wherein the wall includes:
   a first wall portion spaced apart from the first end of the electrode to define a first electrode spark gap; and
   a second portion spaced apart from the second end of the electrode to define a second electrode spark gap.

6. The spark plug of claim 1, wherein the one or more access apertures are disposed circumferentially equidistant from one another on the second cylindrical structure.

7. The spark plug of claim 1, wherein a longitudinal axis of the at least one access aperture is parallel to the plane passing through the electrode spark gap.

8. The spark plug of claim 1, wherein a longitudinal axis of the at least one access aperture intersects with the plane passing through the electrode spark gap at an angle.

9. An engine comprising:
   a cylinder head;
   a piston;
   a main combustion chamber defined between the cylinder head and the piston; and
   a spark plug having a pre-chamber provided in fluid connection with the main combustion chamber and configured to form a flame jet directed into the main combustion chamber, the spark plug extending along a spark plug longitudinal axis and including:
   a first cylindrical structure including a wall defining a bore forming the pre-chamber;
   an electrode positioned inside the bore, wherein the electrode is spaced apart from the wall to define at least one electrode spark gap; and
   a second cylindrical structure receiving the first cylindrical structure and having one or more access apertures configured to facilitate access to the wall of the first cylindrical structure, wherein a plane perpendicular to the spark plug longitudinal axis passes through the electrode spark gap and intersects the one or more access apertures.

10. The engine of claim 9, wherein the first cylindrical structure defines the pre-chamber for the main combustion chamber and includes one or more flow channels at one end to fluidly connect the pre-chamber and the combustion chamber.

11. The engine of claim 9, wherein the one or more access aperture facilitates application of force by a tool to deform the wall of the first cylindrical structure to reduce the electrode spark gap.

12. The engine of claim 9, wherein the electrode includes a first portion, a second portion and a third portion connecting the first and the second portion to define a U-shaped structure of the electrode having a first end and a second end.

13. The engine of claim 12, wherein the wall includes:
   a first portion spaced apart from the first end of the electrode to define a first electrode spark gap; and
   a second portion spaced apart from the second end of the electrode to define a second electrode spark gap.

14. The engine of claim 9, wherein the one or more access apertures are disposed circumferentially equidistant from one another.

15. The engine of claim 9, wherein a longitudinal axis of the at least one access aperture is parallel to the plane passing through the electrode spark gap.

16. The engine of claim 9, wherein a longitudinal axis of the at least one access aperture intersects with the plane passing through the electrode spark gap at an angle.

* * * * *